United States Patent
Kokubu

(10) Patent No.: US 7,567,866 B2
(45) Date of Patent: Jul. 28, 2009

(54) FUEL INJECTION CONTROL DEVICE

(75) Inventor: Shiro Kokubu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 11/892,486

(22) Filed: Aug. 23, 2007

(65) Prior Publication Data
US 2008/0059047 A1 Mar. 6, 2008

(30) Foreign Application Priority Data
Aug. 29, 2006 (JP) .............................. 2006-232711

(51) Int. Cl.
G06F 19/00 (2006.01)
F02D 41/06 (2006.01)
F02M 51/00 (2006.01)
F02N 17/00 (2006.01)

(52) U.S. Cl. ................. 701/113; 701/104; 701/109; 701/115; 123/179.17; 123/486; 123/491; 123/685

(58) Field of Classification Search ........... 123/179.16, 123/179.17, 478, 480, 486, 491, 672, 679, 123/685, 575, 576; 701/101–105, 109, 112, 701/113, 115
See application file for complete search history.

(56) References Cited

U.S. PATENT DOCUMENTS

| | | | |
|---|---|---|---|
| 4,747,386 A * | 5/1988 | Onishi | ......................... 123/491 |
| 5,263,464 A | 11/1993 | Yoshida et al. | |
| 5,794,586 A * | 8/1998 | Oda et al. | .............. 123/179.17 |
| 2004/0162667 A1 | 8/2004 | Abe et al. | |
| 2004/0182378 A1 | 9/2004 | Oshimi et al. | |
| 2004/0186656 A1 * | 9/2004 | Nishiyama | ................... 701/113 |
| 2005/0217644 A1 * | 10/2005 | Shimazaki et al. | ........... 123/501 |

FOREIGN PATENT DOCUMENTS

| | | | |
|---|---|---|---|
| JP | 63-5131 A | | 1/1988 |
| JP | 5-65838 A | | 3/1993 |
| JP | 08193536 A | * | 7/1996 |
| JP | 2002-349305 A | | 12/2002 |
| WO | WO-2006/129198 A1 | | 12/2006 |

* cited by examiner

Primary Examiner—Willis R Wolfe, Jr.
(74) Attorney, Agent, or Firm—Birch, Stewart, Kolasch & Birch, LLP

(57) ABSTRACT

A fuel injection control device of an internal combustion engine capable of using multiple kinds of fuel includes an ECU with a ROM for storing multiple reference fuel injection quantity maps corresponding to mixture concentrations of the multiple kinds of fuels. A control program of the CPU stores which of the multiple reference fuel injection quantity map is used out of the maps in an EEP-ROM, performs starting control of an engine using the reference fuel injection quantity map which is used immediately before stopping previous time at the time of initiating the starting based on the stored maps and, at the same time, performs the starting control by gradually increasing the fuel injection quantity until the starting of an engine is finished. As a result, control of fuel supply is optimized in response to mixing different kinds of fuels, and the engine starting time is shortened.

18 Claims, 14 Drawing Sheets

FUEL INJECTION CONTROL DEVICE

CROSS-REFERENCE TO RELATED APPLICATION

The present application claims priority under 35 U.S.C. §119 to Japanese Patent Application No. 2006-232711, filed Aug. 29, 2006, the entire contents of which are hereby incorporated by reference.

BACKGROUND OF THE INVENTION

1. Field of the Invention

The present invention relates to a fuel injection control device of an internal combustion engine which controls supply of a fuel to the internal combustion engine. The present invention relates more particularly to a fuel injection control device of a multiple-kind fuel internal combustion engine which can use a mixture of plural kinds of fuels.

2. Description of Background Art

There has been known an internal combustion engine (engine) which is operated by burning a multiple kinds of fuels produced by mixing a fuel other than gasoline such as ethanol and gasoline. Such an internal combustion engine requires a control for operating the internal combustion engine with an air-fuel ratio in response to mixing ratios of the respective kinds of fuels.

For example, as a prior art related to a multiple-kind fuel internal combustion engine, JP-A-63-5131 discloses a correction method of a fuel injection time in a fuel injection device of a multiple kind fuel engine (see formula (1) on page 3 and the like).

Further, JP-A-5-65838 describes the constitution which gradually changes a fuel quantity at the time of starting and, at the same time, measures a time during which the starting of the internal combustion engine is detected, and determines a kind of a using fuel (a heavy fuel or a light fuel) in response to the time (claim 1, paragraph 0005 and paragraph 0007).

However, the above-mentioned prior art has following drawbacks.

In general, refueling is performed when an engine is stopped, and in the multiple-kind fuel engine, a person who performs refueling can arbitrarily determine a kind of fuel and a quantity of fuel to be refilled at the time of refueling. Accordingly, the newly refilled fuel is mixed with the fuel remaining in the fuel tank in the inside of the tank. Hence, a mixing ratio cannot be easily detected. Although it may be technically possible to detect the mixing ratio by mounting a fuel kind detection sensor on the fuel tank, a fuel supply pipe to the internal combustion engine or the like, the provision of the fuel kind detection sensor increases the cost significantly.

Although the technique described in JP-A-63-5131 corrects the fuel injection time, the basic injection time (Ti) which is determined based on an engine rotational speed (Ne) and an intake pipe inner absolute pressure (Pba) is fixed. Hence, a plug is covered with an unburnt gas depending on the kind and the mixing ratio of the fuel which the driver refills (that is, a drawback that due to an excessive supply quantity of fuel, and the unburnt gas which remains unburnt after the ignition of the plug adheres to a plug electrode, thus making discharging of the plug electrode difficult).

Further, in the technique described in JP-A-5-65838, although the fuel can be determined, a drawback exists in that a considerable time is necessary for gradually changing the fuel quantity at the time of starting the engine. Further, the technique described in JP-A-5-65838 changes over a fuel supply quantity setting means for heavy fuel use and light fuel use (described in paragraph 0006 and the like). However, the technique does not take the operation of the engine due to the mixing of multiple kinds of fuel into consideration thus giving rise to a drawback that the engine cannot be stably operated after starting.

The present invention has been made in view of the recognition of the above-mentioned drawbacks, and provides a fuel injection control device of a multiple-kind fuel internal combustion engine which performs a stable optimum fuel injection (supply) control in response to mixing ratios of multiple-kind fuels and, at the same time, shortens the starting time, and prevents the covering of the plug.

SUMMARY AND OBJECTS OF THE INVENTION

To overcome the above-mentioned drawback, the present invention provides a fuel injection control device (for example, an ECU 10 in an embodiment) of a multiple-kind fuel internal combustion engine which includes a starting completion detection means (for example, step Sb13 in the embodiment) which detects a starting state of an internal combustion engine (for example, an engine 1 in the embodiment), and determines a fuel injection quantity in response to a state of the internal combustion engine after detecting the completion of starting by the starting completion detection means, wherein a plurality of reference fuel injection quantity maps corresponding to a mixed concentration of a multiple-kind fuel are stored (for example, a reference fuel injection quantity map stored in a ROM 23 in the embodiment), which map out of the plurality of reference fuel injection quantity maps is used is stored, and a start control of the internal combustion engine is performed using the reference fuel injection quantity map which is used immediately before previous stopping at the time of initiating starting based on the stored data and, at the same time, is performed by gradually increasing a fuel injection quantity until the starting of the internal combustion engine is completed.

Due to such a constitution, by storing the reference fuel injection quantity map used in the usual operation, at the time of starting the engine again, it is possible to perform the starting control using the reference fuel injection quantity map corresponding to the mixing ratio of the fuel before the starting.

Further, in the invention described above, the present invention is characterized in that the fuel injection quantity is increased when the starting is not completed even when cranking is performed by injecting fuel predetermined times based on the reference fuel injection quantity map used at the time of initiating the starting.

Due to such a constitution, when the starting is not initiated by the cranking, it is possible to gradually increase the fuel injection quantity each time the number of injection arrives at a fixed value.

Further, in the invention described above, the present invention is characterized in that the fuel injection quantity is increased when the starting is not completed even when cranking is performed by injecting fuel for a predetermined time based on the reference fuel injection quantity map used at the time of initiating the starting.

Due to such a constitution, in the invention described above, when the starting is not initiated by the cranking, it is possible to gradually increase the fuel injection quantity each time a fixed injection time elapses.

Further, in the invention described above, the present invention is characterized in that the reference fuel injection quantity map includes proper number (for example, 22%, 50%, 100%) of three or more kinds of Pb/Ne maps corresponding to mixing ratios of ethanol and gasoline.

Due to such a constitution, by properly selecting the proper Pb/Ne map without performing the adjustment of the Pb/Ne maps corresponding to all mixing ratios, it is possible to stably control the starting control and the control in the usual operation.

Further, in the invention described above, the present invention is characterized in that an oxygen concentration sensor (for example, an O2 sensor 15 in the embodiment) which generates an output in response to oxygen concentration in an exhaust gas is arranged in an exhaust system of the internal combustion engine, and an ethanol mixing ratio in the fuel is estimated based on the output of the oxygen concentration sensor.

Due to such a constitution, it is possible to select and use any one map of the plurality of reference fuel injection quantity maps based on the estimation result of the ethanol mixing ratio.

Further, the present invention provides a fuel injection control device of a multiple-kind fuel internal combustion engine which includes a starting completion detection means which detects a starting state of an internal combustion engine, and determines a fuel injection quantity in response to a state of the internal combustion engine after detecting the completion of starting by the starting completion detection means, wherein a plurality of reference fuel injection quantity maps corresponding to a mixed concentration of a multiple-kind fuel are stored, and a starting control of the internal combustion engine is performed using the reference fuel injection quantity map with the least fuel injection quantity at the time of initiating the starting and, at the same time, the starting control is performed by changing over to the reference fuel injection quantity map with more fuel injection quantity in response to a state of starting until the starting of the internal combustion engine is completed.

Due to such a constitution, at the time of performing the starting, it is possible to perform the start control which gradually increases the fuel injection quantity from a state in which the fuel injection quantity is a least value.

Advantageous effects of the invention include the following:

The present invention is configured such that the plurality of reference fuel injection quantity maps corresponding to the mixed concentration of the multiple-kind fuel are stored, which map out of the plurality of reference fuel injection quantity maps is used is stored. The start control of the internal combustion engine is performed using the reference fuel injection quantity map which is used immediately before previous stopping at the time of initiating starting based on the stored data and, at the same time, is performed by gradually increasing the fuel injection quantity until the starting of the internal combustion engine is completed.

Due to such a constitution, irrespective of the kind and the quantity of fuel which is refilled during the stop, by performing the start control based on the reference fuel injection quantity map used in the usual operation before restarting, the fuel of mixed ratio in the usual operation before restarting remains in the fuel pipe and hence, it is possible to perform the starting of the internal combustion engine at the proper air/fuel ratio at the mixing ratio.

Further, the present invention is configured such that the fuel injection quantity is increased when the starting is not completed even when the cranking is performed by injecting fuel for predetermined times based on the reference fuel injection quantity map used at the time of initiating the starting.

Due to such a constitution, it is possible to gradually increase the fuel injection quantity each time the number of injection arrives at the fixed value and hence, the mixing ratio of the fuel in the inside of the fuel tank can be estimated while obviating the covering of the plug whereby the starting of the internal combustion engine can be performed at the proper air/fuel ratio.

Further, the present invention is configured such that the fuel injection quantity is increased when the starting is not completed even when the cranking is performed by injecting fuel for a predetermined time based on the reference fuel injection quantity map used at the time of initiating the starting.

Due to such a constitution, the fuel injection quantity can be gradually increased each time the fixed injection time elapses and hence, the mixing ratio of the fuel in the inside of the fuel tank can be estimated while obviating the covering of the plug whereby the starting of the internal combustion engine at the proper air/fuel ratio can be performed due to such an estimation.

Further, the present invention is configured such that an oxygen concentration sensor which generates an output in response to oxygen concentration in an exhaust gas is arranged in an exhaust system of the internal combustion engine, and an ethanol mixing ratio in the fuel is estimated based on the output of the oxygen concentration sensor.

Due to such a constitution, it is possible to select and use any one map of the plurality of reference fuel injection quantity maps based on the estimation result of the ethanol mixing ratio and hence, it is possible to operate the internal combustion engine at the proper air/fuel ratio corresponding to the ethanol mixing ratio.

Further, the present invention is configured such that a plurality of reference fuel injection quantity maps corresponding to a mixed concentration of a multiple-kind fuel are stored, and a starting control of the internal combustion engine is performed using the reference fuel injection quantity map with the least fuel injection quantity at the time of initiating the starting and, at the same time, the starting control is performed by changing over to the reference fuel injection quantity map with more fuel injection quantity in response to a state of starting until the starting of the internal combustion engine is completed.

Due to such a constitution, at the time of performing the starting, it is possible to perform the start control by gradually increasing the fuel injection quantity from a state in which the fuel injection quantity is a least value and hence, the mixing ratio of the fuel in the inside of the fuel tank can be estimated whereby the starting of the internal combustion engine can be performed at the proper air/fuel ratio while obviating the covering of the plug.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
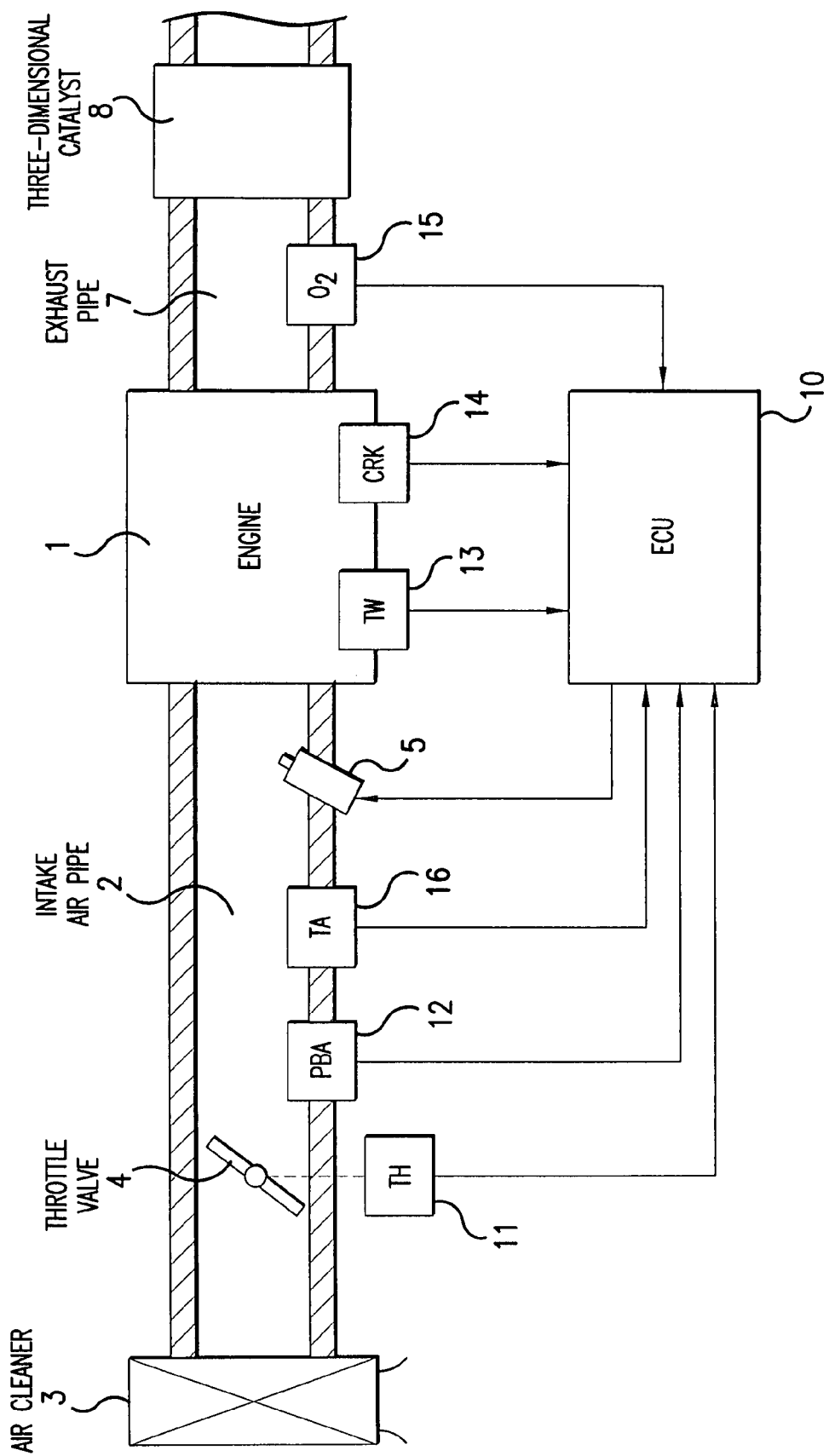
FIG. 1 is an overall constitutional view of an internal combustion engine and a control device of an internal combustion engine according to a first embodiment of the present invention.

FIG. 1 is an overall constitutional view of an internal combustion engine and a control device of the internal combustion engine according to the first embodiment. The engine 1 is operated by burning a multiple-kind fuel which is produced by mixing ethanol and gasoline, for example. An air cleaner 3 which purifies the intake air is provided upstream of an intake pipe 2 of the engine 1. Further, inflow rate of the intake air is adjusted by a throttle valve 4 which is arranged in the inside of the intake pipe 2. A three-dimensional catalyst 8 is provided downstream of an exhaust pipe 7 of the engine 1, and the three-dimensional catalyst 8 purifies components such as HC, CO, NOx and the like in an exhaust gas. An injector 5 is connected to a control device, that is, an ECU (Electronic Control Unit) 10, and injects the multiple-kind fuel of a quantity proportional to an injection time into the inside of the intake pipe 2 in response to injection control signals including an injection time from the ECU 10.

A throttle opening sensor (hereinafter described as a TH sensor) 11 is connected to the throttle valve 4, and measures opening of the throttle valve 4 and inputs the measured opening to the ECU 10. An intake pipe absolute pressure sensor (hereinafter described as a PBA sensor) 12 measures an intake-pipe absolute pressure (PBA) in the inside of the intake pipe 2, and inputs the measured intake-pipe absolute pressure to the ECU 10. An intake air temperature sensor (hereinafter described as a TA sensor) 16 measures an intake temperature (TA) in the inside of the intake pipe 2, and inputs the measured intake temperature to the ECU. A water temperature sensor (hereinafter described as a TW sensor) 13 measures a cooling water temperature of the engine 1 and inputs the measured cooling water temperature (TW) to the ECU 10. A crank angle sensor (hereinafter described as a CRK sensor) 14 measures a crank angle (CRK) indicative of a crank position of the engine 1, and inputs the measured crank angle to the ECU 10. An oxygen concentration sensor (hereinafter described as an O2 sensor) 15 measures an oxygen concentration of an exhaust gas in the inside of the exhaust pipe 7 and inputs the measured oxygen concentration to the ECU 15.

Figure 2:
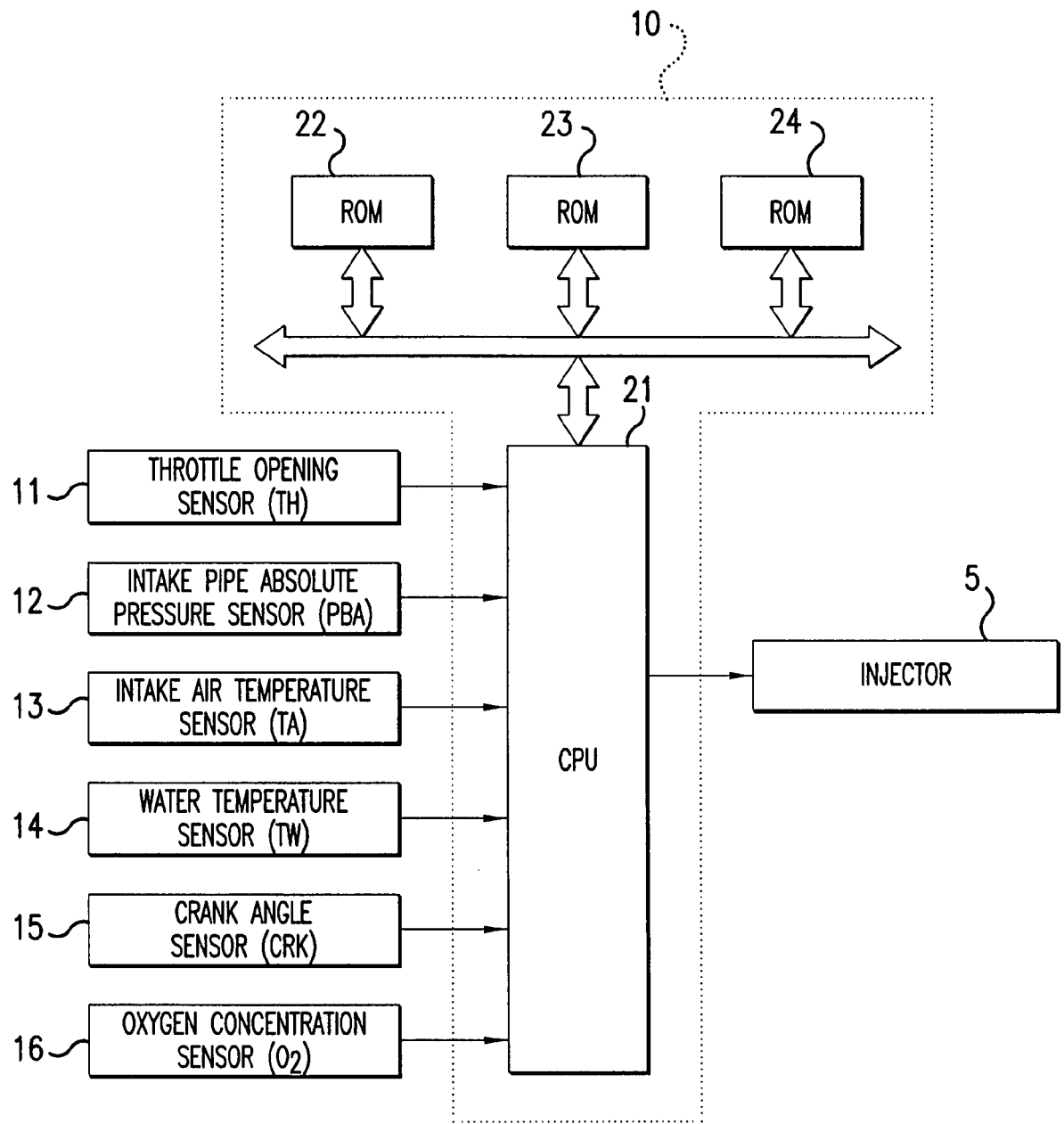
FIG. 2 is a view showing the internal constitution of an ECU and a connection relationship between a sensor and an injector according to the first embodiment of the present invention.

FIG. 2 is a block diagram showing the internal constitution of the ECU 10. The ECU 10 includes a CPU (Central Processing Unit) 21, a RAM (Random Access Memory) 22, a ROM (Read Only Memory) 23, and an EEP-ROM (Electronically Erasable and Programmable Read Only Memory) 24. These parts are mutually connected with each other via an internal bus in the inside of the ECU 10. The CPU 21 is connected with the TH sensor 11, the PBA sensor 12, the TA sensor 16, the TW sensor 13, the CRK sensor 14, and the O2 sensor 15 via an I/O (Input/Output) bus, and measurement information measured by the respective sensors is inputted to the CPU 21 from the respective sensors. Further, the CPU 21 is connected with the injector 5 via the I/O bus, wherein by inputting the injection control signal to the injector 5, it is possible to allow the injector 5 to inject the multiple-kind fuel of a quantity corresponding to the injection time included in the injection control signal.

The RAM 22 is used as an operational region of a control program which is operated in the CPU 21 or the like. The RAM 22 is a memory device which erases the information stored in the inside thereof when the supply of the electricity is stopped. The ROM 23 is a memory device which preliminarily stores a control program which is operated by the CPU 21, and a Pb/Ne map, an Ne/TH map, a correction coefficient table, a starting control information and the like which constitute control information for controlling the engine 1. The ROM is also a memory device which holds the information stored in the inside thereof without erasing the information even when the supply of electricity is stopped. The EEP-ROM 24 is a memory device which performs writing and erasing of the information by the CPU 21 during the operation of the CPU 21 and holds the information stored in the inside thereof without erasing even when the supply of electricity is stopped.

Next, the principle of the control of the engine 1 by the ECU 10 is explained. The engine 1 is operated in a suitable state when the air/fuel ratio which is a ratio between air which flows through the intake pipe 2 and the fuel which is injected from the injector 5 assumes a proper value. Here, the air/fuel ratio is expressed as a value which is obtained by dividing the air quantity by the fuel quantity. The ECU 10, to operate the engine 1 at an optimum state under various conditions, calculates the proper injection fuel quantity and performs a control to allow the injector 5 to inject the calculated injection fuel quantity. As a calculation method of the fuel injection quantity by the ECU 10, depending on the difference in the required injection fuel quantity, method which differ from each other are adopted between at the time of starting the engine 1 and at the time of performing the usual operation of the engine 1. Here, the usual operation time indicates a state in which the engine 1 performs a self traveling operation without relying on a starter or the like.

Figure 3:
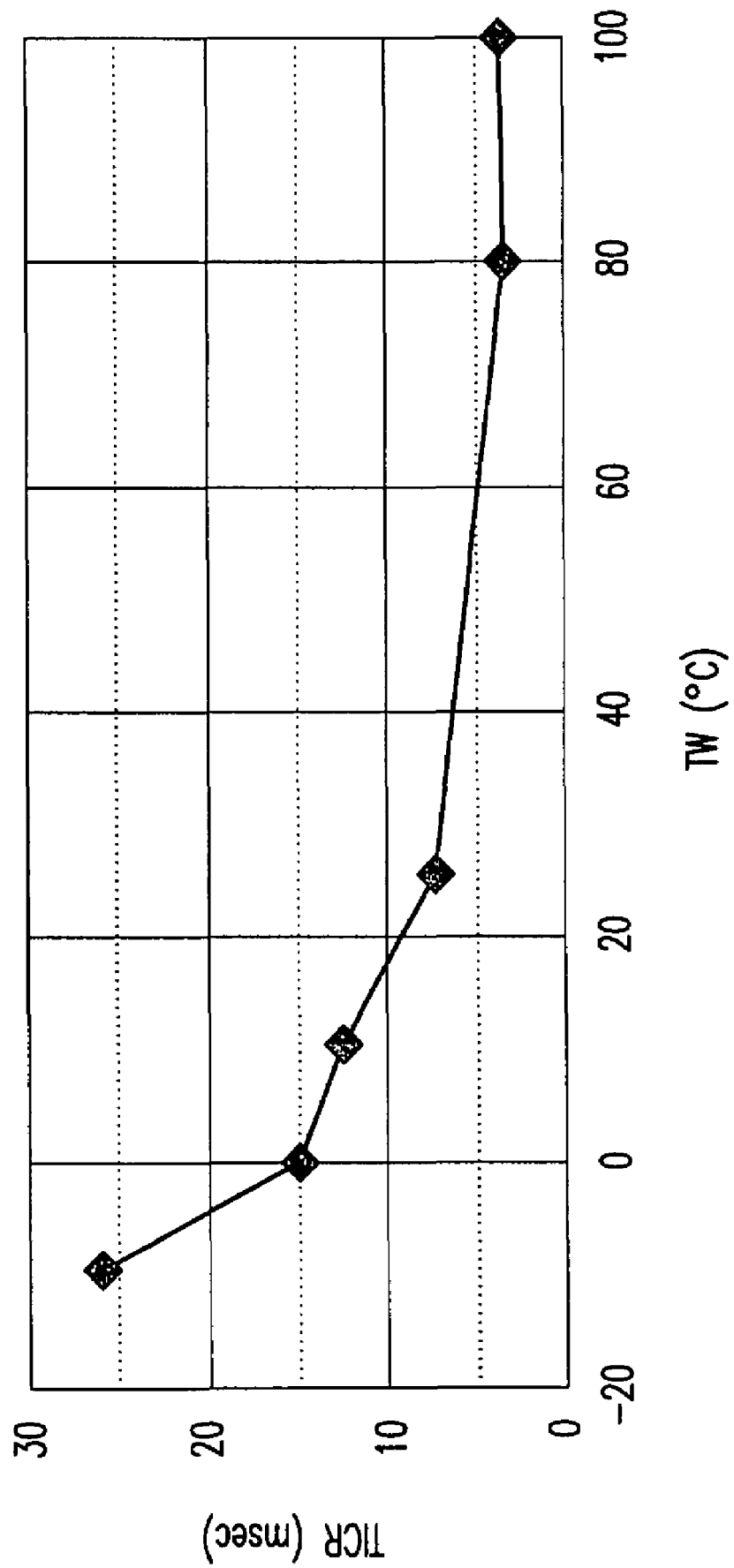
FIG. 3 is a view showing a starting injection table according to the first embodiment of the present invention.

Calculation of injection fuel quantity at the time of starting engine 1 is described next. The starting injection time (TICR) in which the injector 5 is allowed to inject the fuel at the time of starting the engine 1 is a value which is univocally determined based on a water temperature (TW) of cooling water of the engine 1 provided that only one kind of fuel is used. To be more specific, a starting injection table shown in FIG. 3 which indicates a corresponding relationship between the water temperature (TW) and the starting injection time (TICR) is preliminarily stored in the ROM 23, and the starting injection table is referenced at the time of starting thus acquiring the starting injection time based on the water temperature (TW) which the TW sensor 13 measures. Then, the control to allow the injector 5 to inject is performed during the acquired starting injection time. Here, a corresponding relationship between the TW and the TICR of the starting injection table is preliminarily calculated based on an experimental result or the like.

Figure 4A:
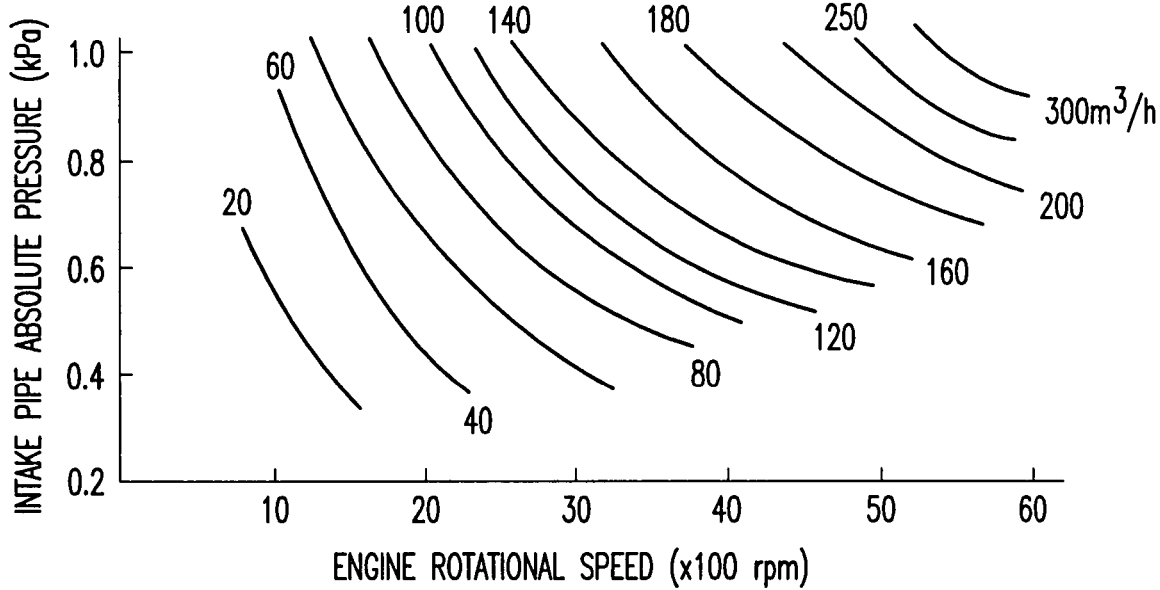
FIGS. 4(a) and 4(b) are views showing a Pb/Ne map and an Ne/TH map according to the first embodiment of the present invention.
Figure 4B:
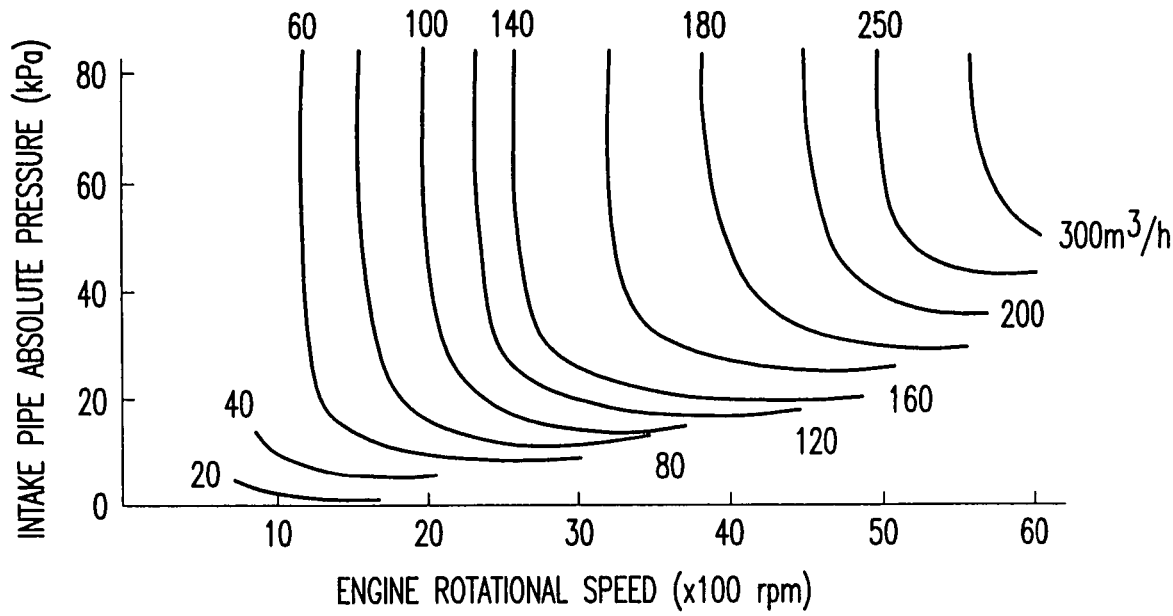

Calculation of injection fuel quantity at the time of performing the usual operation is described next. At the time of performing the usual operation, by referencing the Pb/Ne map or the Ne/TH map which is preliminarily obtained based on experimental results or the like, the intake air quantity is obtained under various conditions. Then, based on the obtained intake air quantity and the preset target air/fuel ratio, the basic fuel injection time (TIM) is calculated. FIG. 4(a) is a view showing an example of the Pb/Ne map and FIG. 4(b) is a view showing an example of the Ne/TH map.

The Pb/Ne map is a map which is used for an estimation system of intake oxygen quantity which is referred to as a speed density system adopted at the time of performing a low-load operation such as idling of the engine. Using this map, the intake air quantity is obtained based on the intake pipe absolute pressure (PBA) and the engine rotational speed (Ne). As shown in FIG. 4(a), no fixed correlation is established between the Pb and the Ne and hence, the intake air quantity is identified using the map as an isotropic air quantity diagram.

Further, the Ne/TH map is a map which is used for an estimation system of an intake oxygen quantity which is referred to as a throttle speed system adopted at the time of performing a high-load operation. Using this map, the intake air quantity is obtained based on the engine rotational speed (Ne) and the throttle opening (TH). As shown in FIG. 4(b), also in the Ne/TH map, in the same manner as the Pb/Ne map, no fixed correlation is established between the Ne and the TH and hence, the intake air quantity is identified by using the map as an isotropic air quantity diagram.

Figure 5:
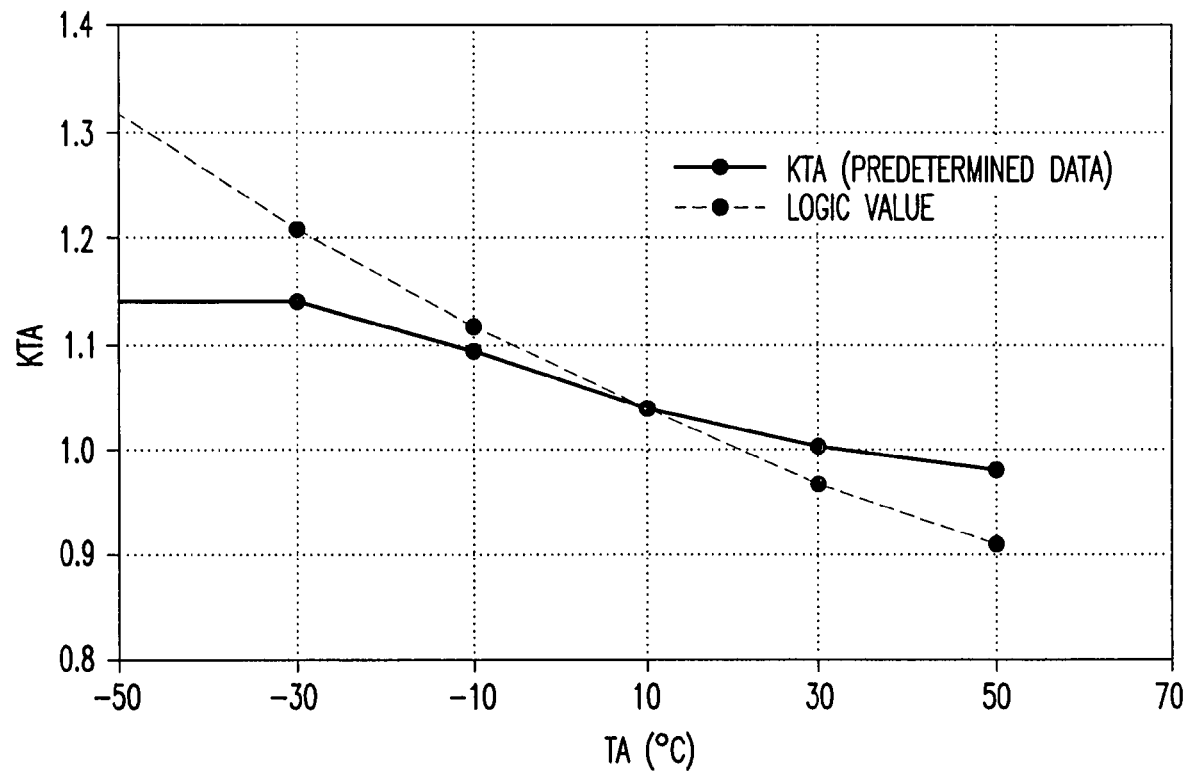
FIG. 5 is a view showing a correction coefficient table to obtain an intake air temperature correction coefficient according to the first embodiment of the present invention.

When a basic fuel injection time (TIM) is calculated based on the intake air quantity which is obtained from the Pb/Ne map or the Ne/TH map, as a next step, it is necessary to correct the basic fuel injection time (TIM) based on difference in environmental conditions between an experimental state and an operation state of the actual engine 1. FIG. 5 is a graph showing an example of a correction coefficient table for obtaining an intake air temperature correction coefficient (KTA) corresponding to an intake air temperature (TA) which is obtained by the TA sensor 16 for measuring the intake air temperature. As other correction coefficients, correction coefficients based on measured values which are obtained by the TH sensor 11, the TW sensor 13, the CRK sensor 14 and the O2 sensor 15. To be more specific, the correction coefficients such as a post-starting increased quantity correction coefficient (KAST), a water temperature correction coefficient (KTW), an acceleration correction coefficient (TACC), an asynchronicity correction coefficient (OPINJ), an ignition timing coefficient and the like are named. The correction coefficient table is provided for every correction coefficient, and the above-mentioned basic fuel injection time (TIM) and a fuel injection time (Tout) in which fuel is actually injected by the injector 5 is calculated based on these plurality of correction coefficients.

Figure 6:
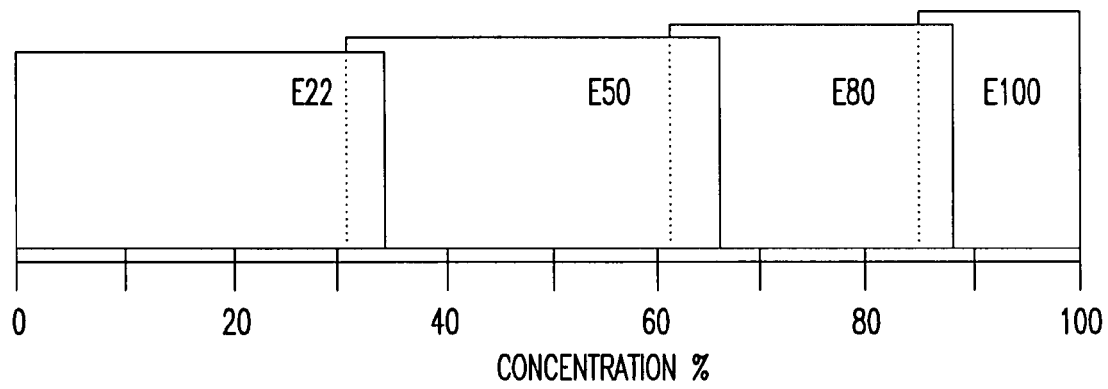
FIG. 6 is a view showing a range of concentration of ethanol according to the first embodiment of the present invention.

Engine control using multiple kinds of fuel is decribed next. As described in the above-mentioned patent document JP-A-63-5131, ethanol contains an oxygen atom O in the composition thereof and hence, an oxygen quantity necessary for the combustion per unit volume becomes small compared to a case in which gasoline is burnt. Accordingly, when multiple kinds of fuel produced by mixing ethanol and gasoline is used, a theoretical air/fuel ratio becomes small compared to a case in which only gasoline is used as the fuel. Accordingly, to operate the engine 1 in an optimum state, it is necessary to set the Pb/Ne map, the Ne/TH map, and various correction coefficient tables for mixing ratios of ethanol and gasoline. Here, it has been known from experimental results or the like that in a state that ethanol exhibits certain concentration, even when the map and table for operating the engine 1 in an optimum state are applied to ethanol of other concentration which falls within a fixed range, it is possible to perform control of the substantially same level as control which is performed in a case in which proper map and table are provided for another concentration. Accordingly, in this embodiment, a range of concentration shown in FIG. 6 is set, and as reference concentrations of ethanol in respective ranges, four kinds of concentrations consisting of 22% of ethanol (E22), 50% of ethanol (E50), 80% of ethanol (E80), 100% of ethanol (E100) are preliminarily set, and the Pb/Ne maps, the Ne/TH maps and various correction coefficient tables are formed for the respective ethanol concentrations. Here, it is sufficient to provide three or more reference concentrations, and the reference concentrations may be properly allocated to any concentrations from 0% to 100%. Further, the respective maps and tables are set such that the maps and tables possess ranges where the map and table overlap each other as concentrations as shown in FIG. 6.

Figures 7A, 7B:
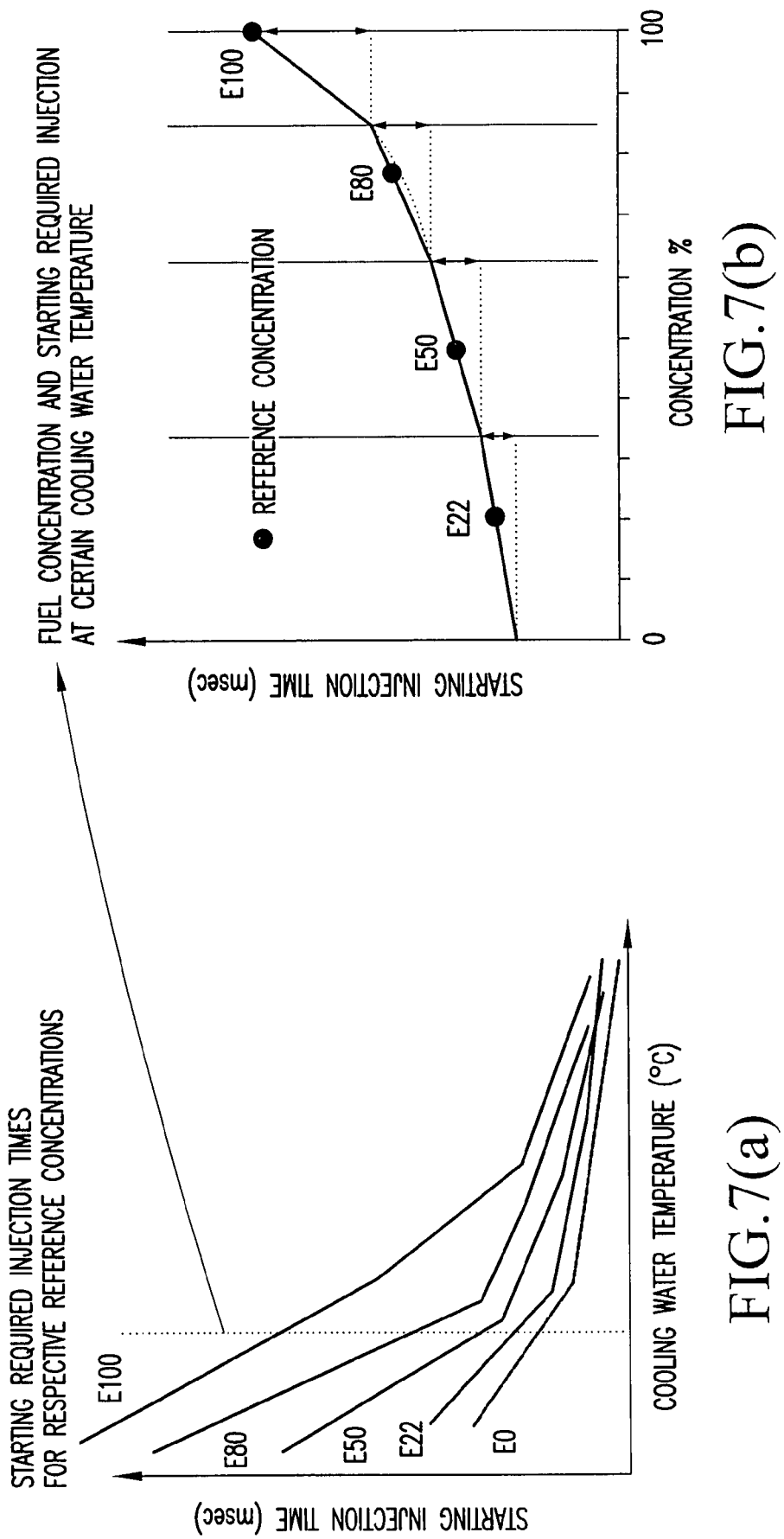
FIGS. 7(a) and 7(b) are views showing a range of concentration of ethanol in the starting injection table and a starting control according to the first embodiment of the present invention.

Further, also with respect to the starting injection time, even with the fixed water temperature (TW) as shown in FIG. 7(a), the optimum injection time differs for every ethanol concentration and hence, to maintain the favorable starting performance, it is necessary to set the injection time such that the excessive fuel injection is prevented when the ethanol concentration is at a lower-limit fuel concentration, and the maximum injection can be performed when the ethanol concentration is at an upper limit. Accordingly, also with respect to the starting injection time, a range of concentration shown in FIG. 7(b) is set, and four starting injection tables are preliminarily stored in the ROM 23 as using 22% (E22) of ethanol, 50% (E50) of ethanol, 80% (E80) of ethanol, 100% (E100) of ethanol as reference concentrations. Further, in the starting injection tables, the correspondence among an increment width $\Delta ti$ of the starting injection time, the number of repetition N indicative of times which become the reference for increasing the injection time by the above-mentioned increment width in response to the number of injections, and an upper limit value Tmax of the starting injection time which constitute preset constants is made. Values of these constants are also preliminarily stored in the ROM 23. Hereinafter, the starting injection tables and the information which includes these constants are described as starting injection information.

Figure 8:
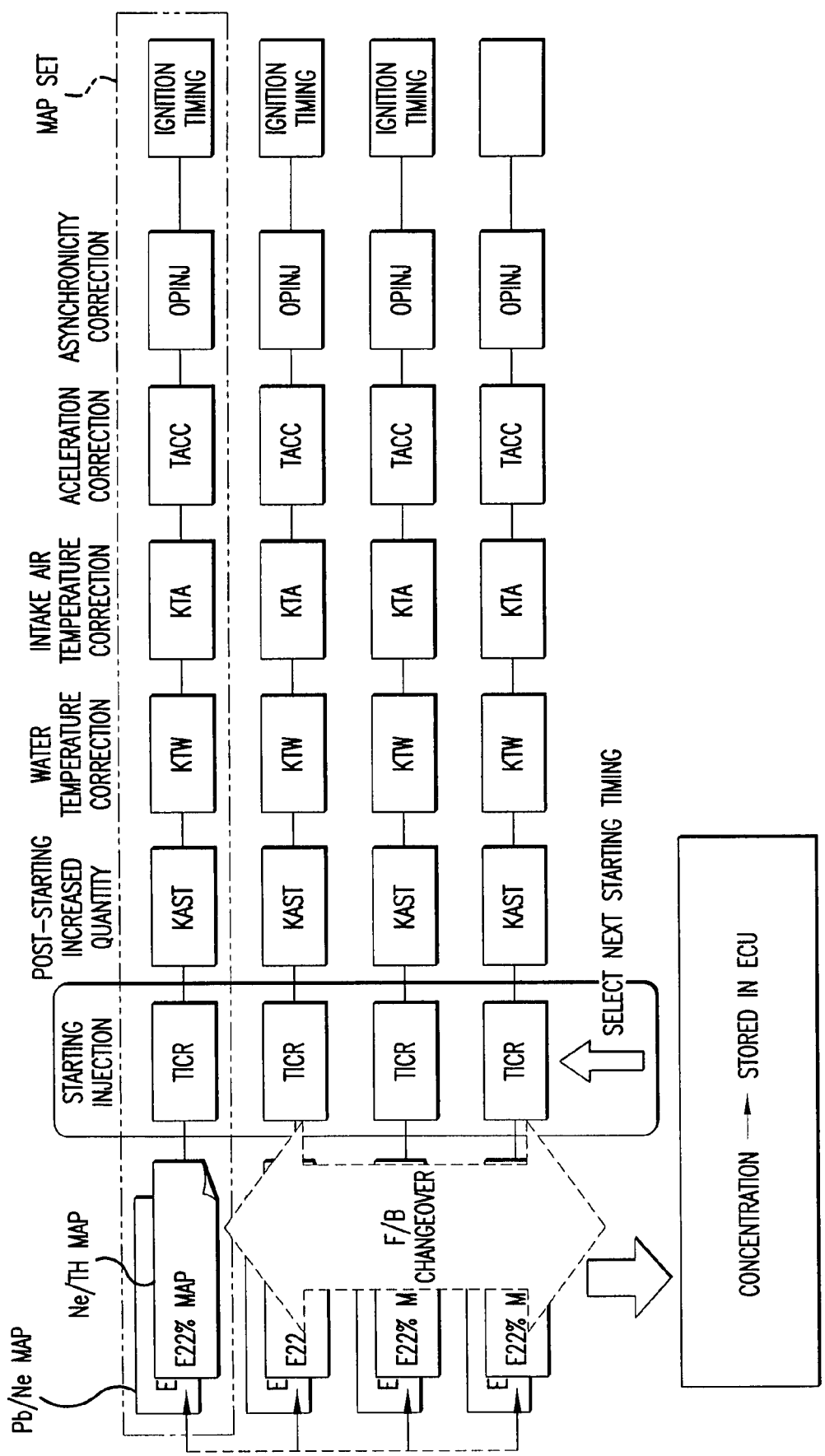
FIG. 8 is a view showing a reference fuel injection quantity map according to the first embodiment of the present invention.

In the ROM 23, as shown in FIG. 8, the Pb/Ne maps, the Ne/TH maps, the various correction coefficient tables and the starting injection information which are prepared for respective reference concentrations of ethanol are prestored as a set of maps (hereinafter referred to as the reference fuel injection quantity maps). Further, these reference fuel injection quantity maps are referred to as map set. By storing the map sets, it is possible to perform the control of the engine 1 in the whole range of ethanol concentrations using four sets of reference fuel injection quantity maps. Further, by representing the ethanol content which is continuously changeable from 0% to 100% as the values of the reference concentrations of four kinds of ethanol using four sets of reference fuel injection quantity maps, the correction of the proper reference concentration based on the reference fuel injection quantity maps can be made small thus stabilizing the operation state. Here, the reference fuel injection quantity maps for the respective reference concentrations are respectively described as an E22% map, an E50% map, an E80% map and an E100% map hereinafter.

Figure 9:
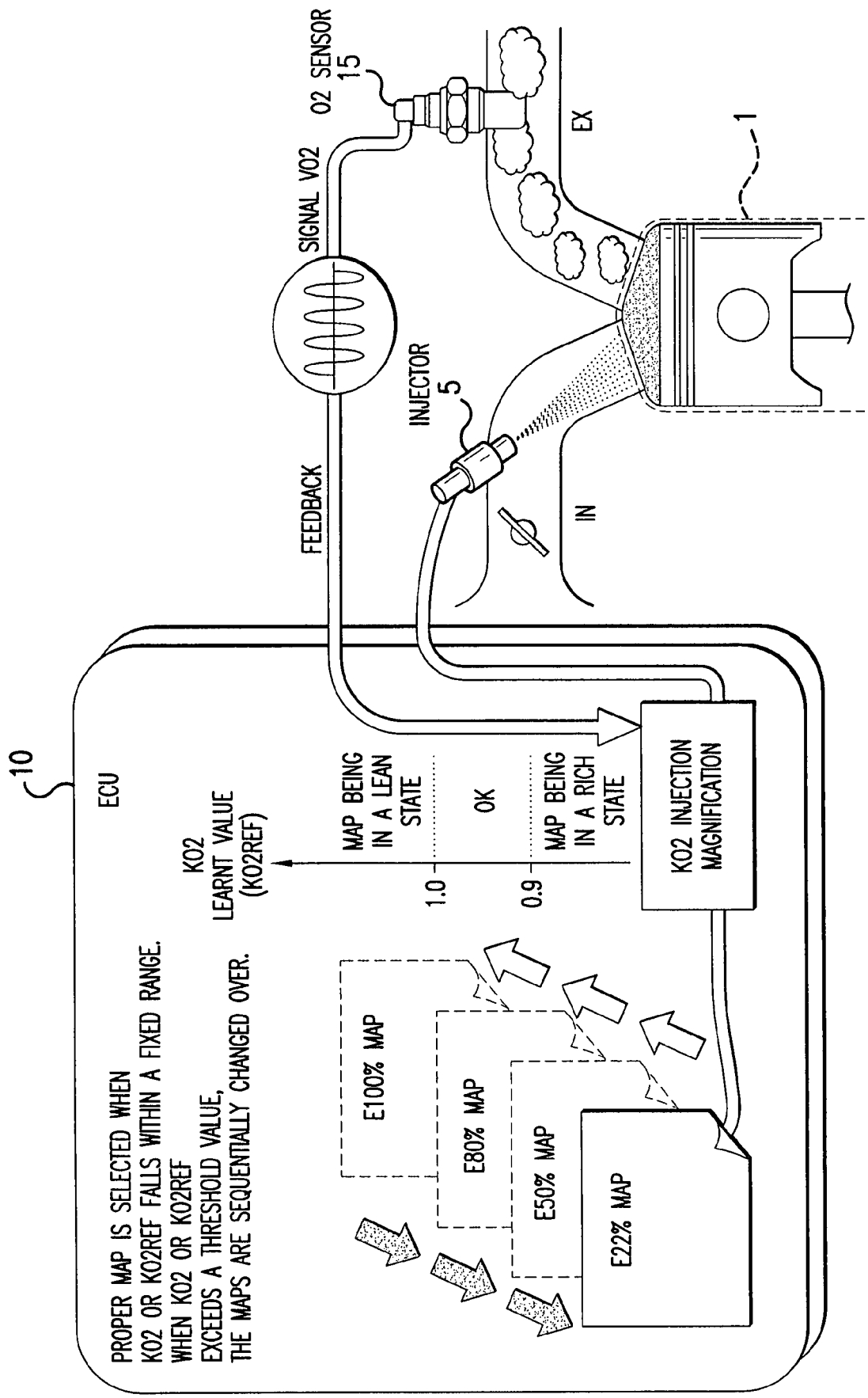
FIG. 9 is a conceptual view of a processing for changing over the reference fuel injection quantity maps according to the first embodiment of the present invention.

Next, the changeover of the E22% map, the E50% map, the E80% map and the E100% map in the control program of the CPU 21 is explained. As shown in FIG. 9, changeover of the maps in the control programs of the CPU 21 is performed by referencing a required injection quantity magnification KO2 or an average learnt value (KO2REF) of the KO2 which the control program of the CPU 21 calculates in response to a signal (VO2) indicative of the oxygen concentration of the exhaust gas which the O2 sensor 15 detects. The required injection quantity magnification KO2 exhibits a large value when the concentration of oxygen in the exhaust gas is high and, exhibits a small value when the concentration of the oxygen in the exhaust gas is low. Accordingly, when the KO2 or the KO2REF exhibits a large value, this implies the state in which the fuel injection quantity from the injector 5 is small (lean state), and it is determined that ethanol concentration is high due to the operation of the engine 1 with the small fuel injection quantity and hence, changeover of the map to the map which exhibits the high ethanol concentration is performed. On the other hand, when the KO2 or the KO2REF exhibits a small value, this implies a state in which the fuel injection quantity from the injector 5 is large (rich state), and it is determined that ethanol concentration is low due to the operation of the engine 1 with the large fuel injection quantity and hence, the processing for changing over the maps to the map which exhibits the low ethanol concentration is performed.

Figure 10:
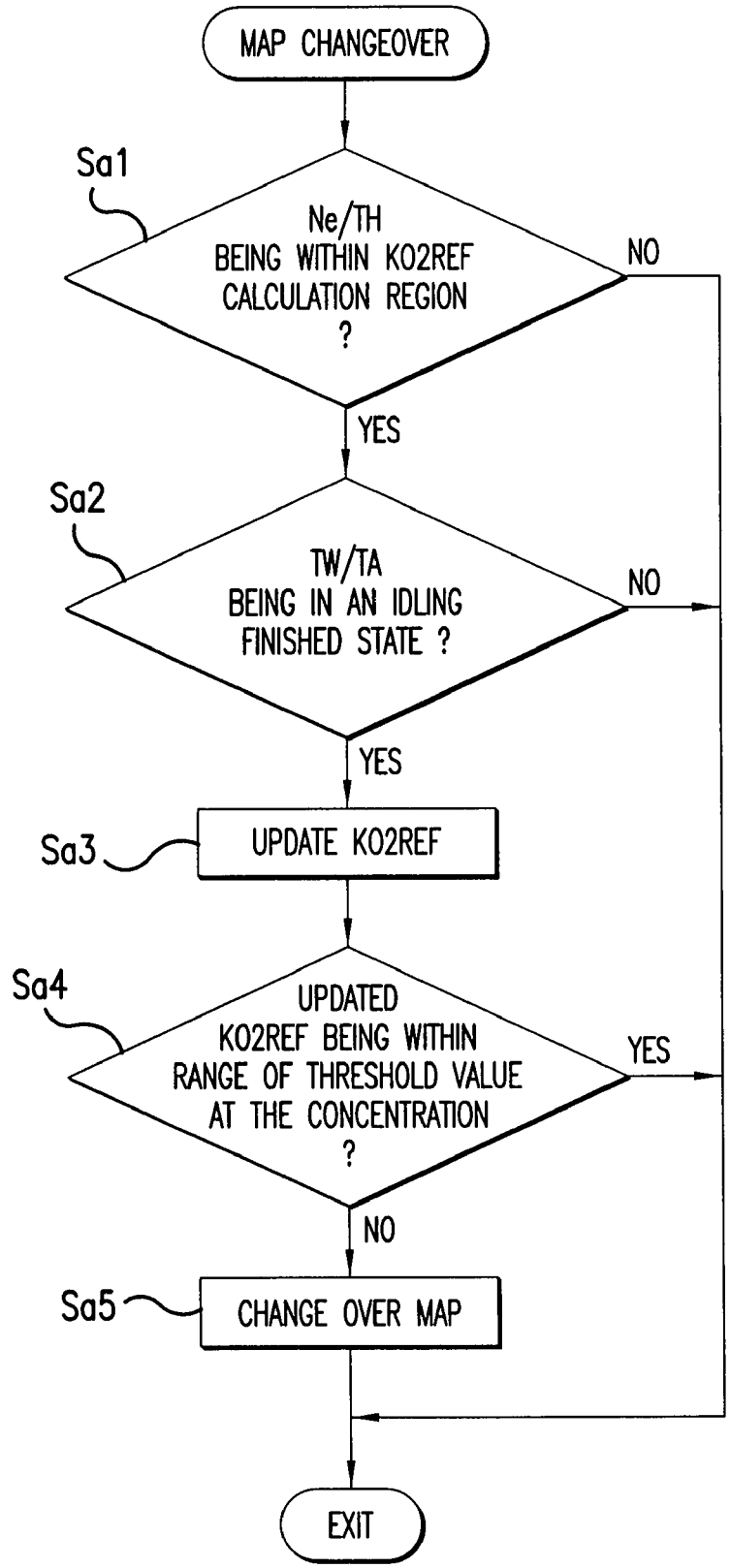
FIG. 10 is a flowchart showing the processing for changing over the maps at the time of performing the usual operation according to the first embodiment of the present invention.

FIG. 10 is a flowchart showing the processing for changing over the reference fuel injection quantity maps in the control program of the CPU 21 at the time of performing the usual operation. The reference fuel injection quantity map changeover processing in this flowchart is repeatedly called and executed in steps of the control processing at the time of performing the usual operation. First of all, an engine rotational speed (Ne) is calculated based on a measured value obtained from the CRK sensor 14, and it is determined whether the calculated engine rotational speed (Ne) and the throttle opening (TH) obtained from the TH sensor 11 are present within a KO2REF calculation region shown in FIG. 11 or not (step Sa1). When the engine rotational speed (Ne) and the throttle opening (TH) are present outside the KO2REF calculation region, the changeover of the reference fuel injection quantity map is not performed and the processing is finished. When the engine rotational speed (Ne) and the throttle opening (TH) are present within the KO2REF calculation region, next, the water temperature (TW) of cooling water and the intake air temperature (TA) are measured by the TW sensor 13 and the TA sensor 16, and it is determined whether the engine 1 is in an idling finished state, that is, in a usual operational state or not (step Sa2). When it is determined that the engine 1 is not in the idling finish state, the changeover of the reference fuel injection quantity map is not performed and the processing is finished. When it is determined that the engine is in the idling finish state, the KO2REF is updated. That is, the average learning is performed based on the value of the KO2 obtained based on the oxygen concentration newly measured by the O2 sensor 15 thus calculating the KO2REF, and the calculated KO2REF is updated as new KO2REF (step Sa3).

Figure 12:
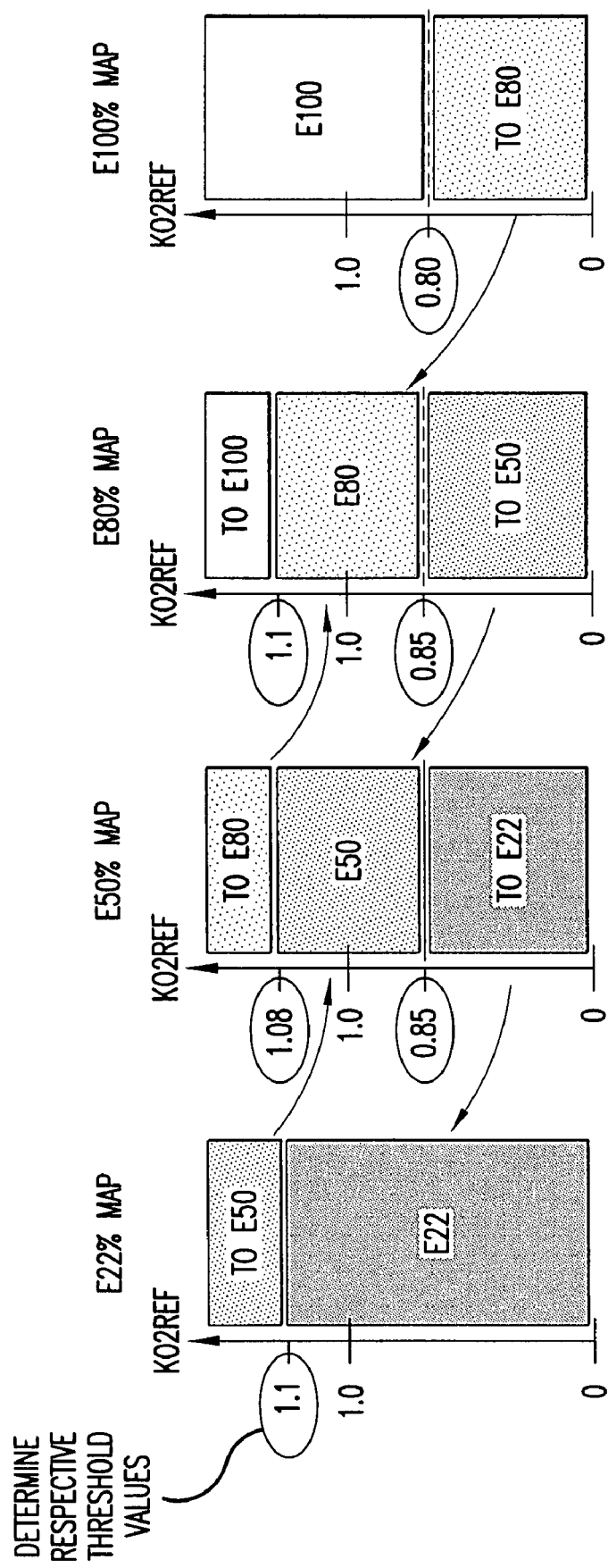
FIG. 12 is a view showing a threshold value of the KO2REF which is referenced in map changeover processing at the time of performing the usual operation in the first embodiment of the present invention.

Next, it is determined whether the updated KO2REF falls within a range of a threshold value in the current ethanol reference concentration or not (step Sa4). Here, the threshold value at the reference concentration is constituted of upper-limit and lower-limit threshold values which are set for every reference concentration shown in FIG. 12. The threshold values are determined with adjustment such that respective maps overlap each other. For example, as shown in FIG. 12, in the case of the E20% map, the lower-limit threshold value is 0 and the upper-limit threshold value is 1.1. In the case of the E50% map, the lower-limit threshold value is 0.85 and the upper-limit threshold value is 1.08. In the case of the E80% map, the lower-limit threshold value is 0.85 and the upper-limit threshold value is 1.1. In the case of the E100% map, only the lower-limit threshold value is set and the value is 0.80. For example, in a state that the present reference concentration is E50%, when the KO2REF takes a value which falls within a range from 0.85 to 1.08, it is determined that the present reference concentration falls within the threshold range and the changeover of the map is not performed. On the other hand, the KO2REF assumes a value less than 0.85, the changeover to the E22% map is performed (step Sa5). Further, when the KO2REF exceeds 1.08, the changeover to the E80% map is performed (step Sa5).

When the map changeover processing shown in FIG. 10 is performed again after changing over the map to the E80% map, due to the changeover of the map to the E80% map, the oxygen concentration measured by the O2 sensor 15 is changed and hence, the KO2 is also changed. Then, for example, when the KO2REF is calculated as 1.0 due to average learning based on the KO2, the ethanol concentration becomes stable in a state of E80% map.

Figure 11:
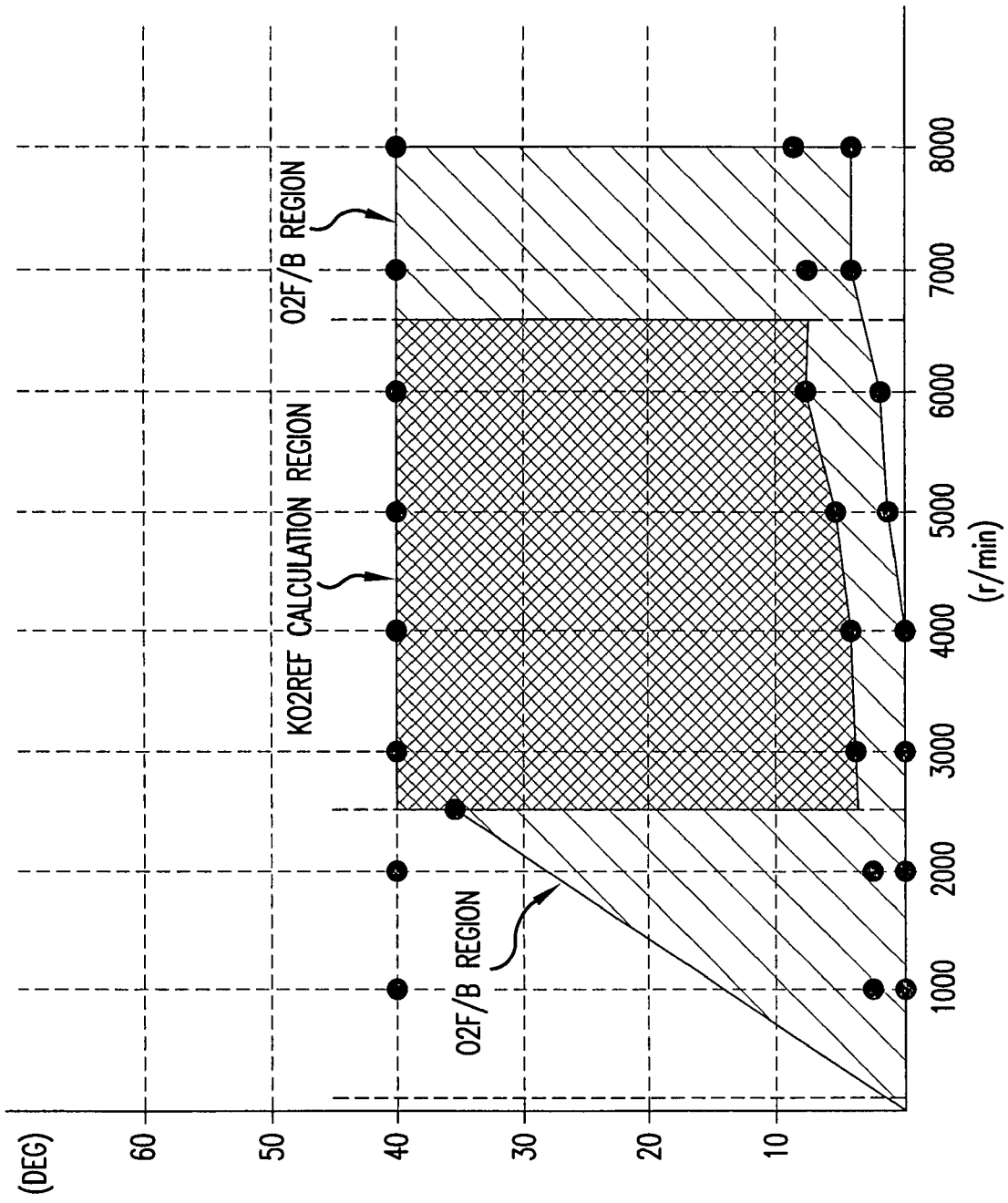
FIG. 11 is a view showing a calculation region of a KO2REF which is referenced in map changeover processing at the time of performing the usual operation in the first embodiment of the present invention.

Based on the above-mentioned reference fuel injection quantity map changeover processing explained in conjunction with FIG. 10 to FIG. 12, the map corresponding to the reference concentration of ethanol can be selected and hence, even when the ethanol concentration is changed at the time of performing the usual operation, it is possible to operate the engine 1 in an optimum state. Further, due to the constitution which detects the change of ethanol concentration based on the oxygen concentration detected by the O2 sensor 15, it is unnecessary to provide the ethanol concentration sensor in the inside of the fuel tank and hence, the reduction of cost can be realized.

Here, in the reference fuel injection quantity map changeover processing explained in conjunction with FIG. 10, the processing which uses the KO2REF as the reference is described. However, the processing shown in FIG. 10 may be performed by adopting the KO2 calculated based on the oxygen concentration measured by the O2 sensor 15 in place of the KO2REF.

Figure 13:
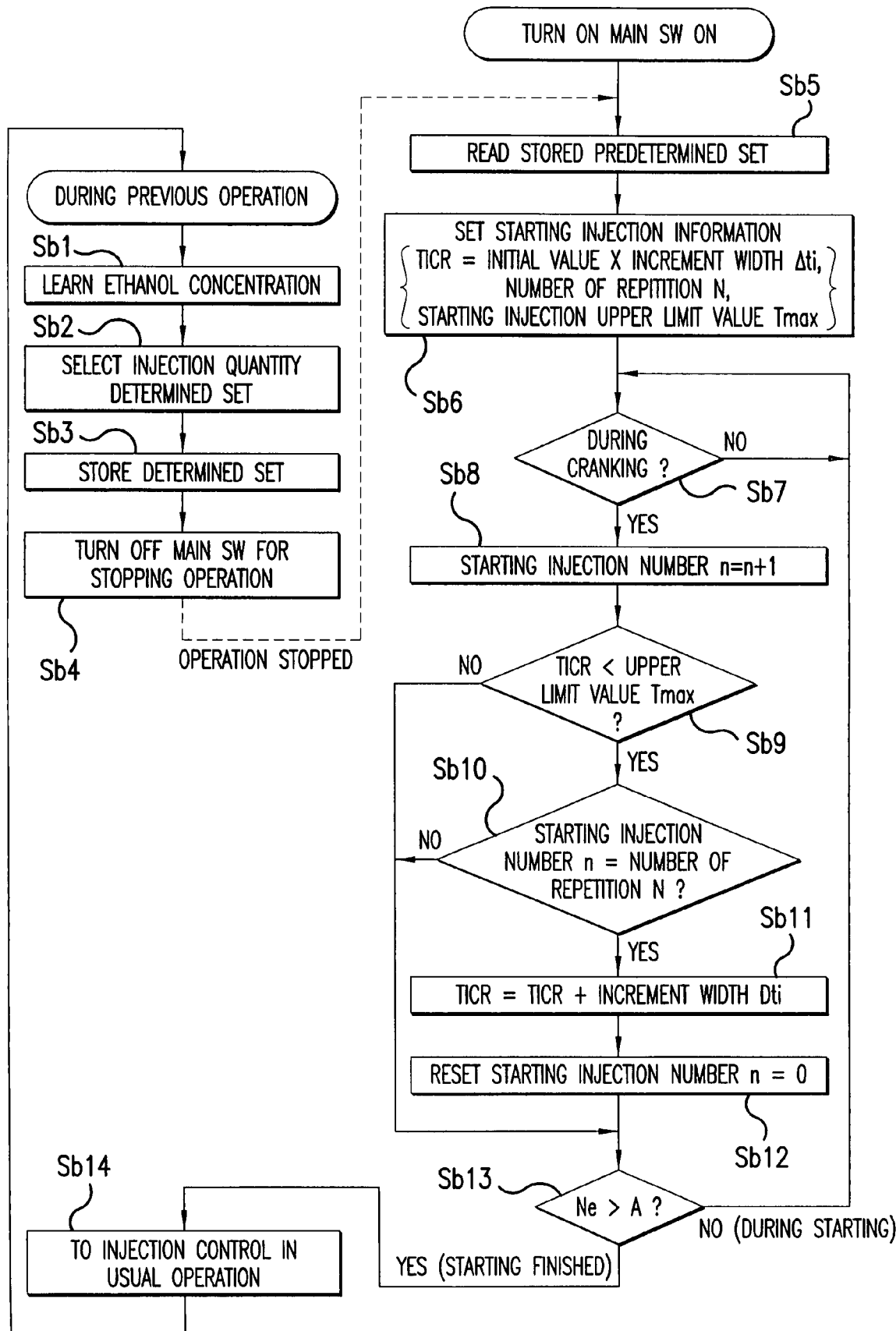
FIG. 13 is a flowchart showing a processing of a starting control according to the first embodiment of the present invention.
Figure 14:
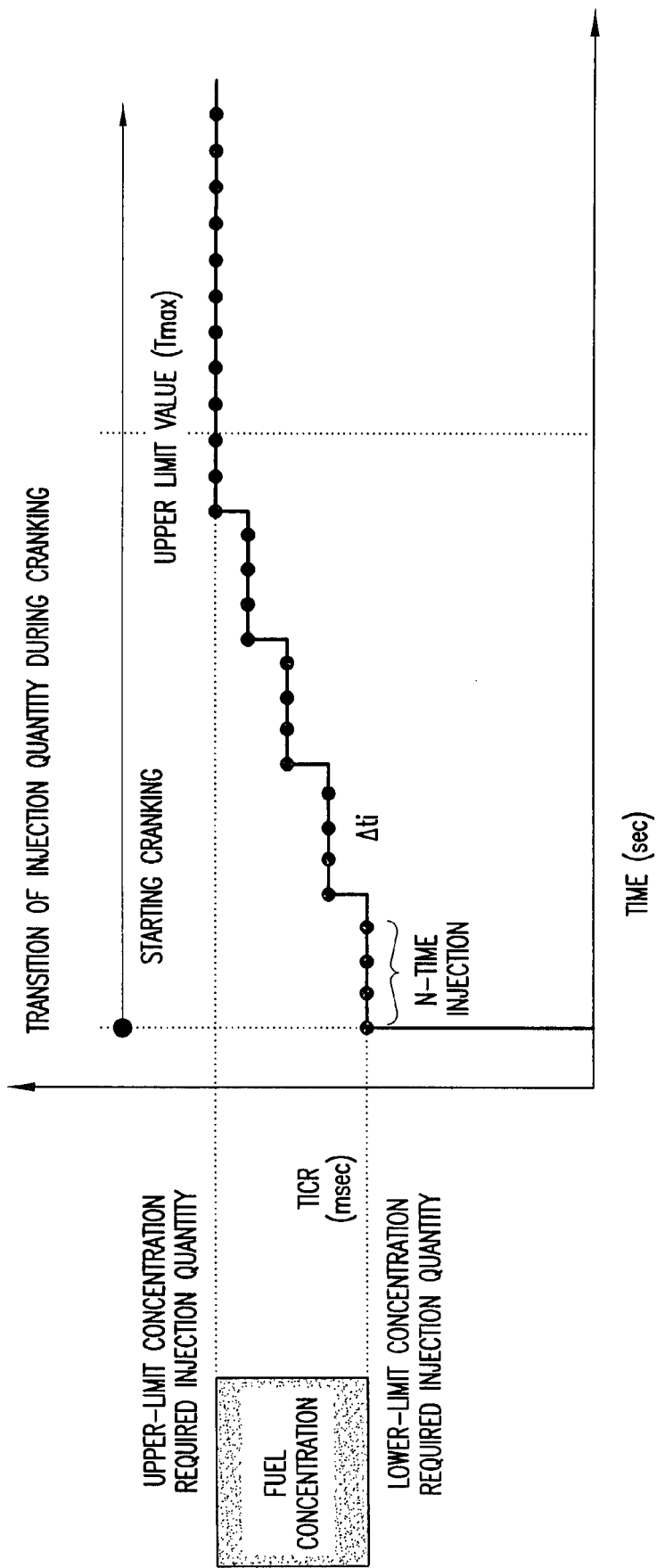
FIG. 14 is a flowchart showing the change of a TICR in the processing of the starting control according to the first embodiment of the present invention.

Next, in conjunction with FIG. 13 and FIG. 14, the explanation is made with respect to the starting control in which the ethanol concentration during operation is detected at the time of performing the usual operation, and when the engine 1 is operated again after stopping, starting of engine is initiated by reference to the ethanol concentration detected during the operation.

In FIG. 13, first of all, during the usual operation, the control program of the CPU 21 calculates the ethanol concentration based on the oxygen concentration which the O2 sensor 15 measures, and performs the average learning on the calculated ethanol concentration thus calculating an ethanol concentration learnt value (step Sb1).

Next, the reference concentration is obtained based on the range of the ethanol concentration shown in FIG. 6 and the calculated ethanol concentration learnt value, and as a predetermined set to be stored in the EEP-ROM 24 based on the obtained reference concentration, any one of the E22% map, the E50% map, the E80% map and the E100% map which constitute the above-mentioned reference fuel injection quantity maps is selected (step Sb2). Then, the selected predetermined set and the reference concentration are stored in the EEP-ROM 24 (step Sb3). Thereafter, a main SW (switch) is turned off thus stopping the supply of electricity to the ECU 10 from the battery (step Sb4). Here, although the information stored in the RAM 22 is erased, the information stored in the ROM 23 and the information stored in the EEP-ROM 24 are held.

Next, the main SW is turned on and the supply of electricity to the ECU 10 from the battery is started thus starting the control program of the CPU 21, and the control program reads the predetermined set from the EEP-ROM 24 (step Sb5). Then, the control program reads the starting injection information from the read predetermined set, and obtains the TICR which is an initial value of the starting injection time based on the starting injection table contained in the read starting injection information and the water temperature of the cooling water of the engine 1 measured by the TW sensor 13. Further, the control program also reads the increment width $\Delta ti$, the number of repetition N and the starting injection timing upper limit value Tmax contained in the starting injection information from the starting injection information, and performs setting of these information in the control program. Here, a variable of the starting injection number n is reset to 0 (step Sb6).

Next, the control program determines whether the operation on the engine is during cranking or not (step Sb7). When the operation of the engine is not during cranking, until the cranking is started, the determination is continued. When it is determined that the operation of the engine is during cranking, a value which is obtained by adding 1 to the present starting injection number n substitutes the starting injection number n. In the initial time, 1 substitutes the starting injection number n (step Sb8).

Next, the control program determines whether the starting injection time TICR is less than the starting injection time upper limit value Tmax or not (step Sb9). When it is determined that the starting injection time TICR is less than the starting injection time upper limit value Tmax (step Sb9: YES), next, the control program determines whether the starting injection number n is equal to the number of repetition N or not (step Sb10). When the control program determines that the starting injection number n is equal to the number of repetition N (step Sb10: YES), a value which adds the increment width $\Delta ti$ to the present TICR substitutes the TICR (step Sb11) and the starting injection number n is reset to 0 (step Sb12). Next, the control program determines whether the starting is finished or not based on whether the present engine rotational speed (Ne) which is calculated based on the measured value of the CRK sensor 14 exceeds the threshold value (A) indicative of the rotational speed which becomes the reference for the starting determination or not (step Sb13). When the control program determines that the present engine rotational speed (Ne) exceeds the threshold value (A) and the starting is finished (step Sb13: YES), since the usual operation is started, repeatedly performs the processing from step Sb1 to step Sb3 until the main SW is turned off while performing the injection control at the time of performing the usual operation, that is, while performing the processing shown in FIG. 10 (step Sb14).

On the other hand, it is determined that when the present engine rotational speed (Ne) is equal to or less than the threshold value (A) and the engine is during the starting (step Sb13: NO), the processing returns to step Sb7 for continuing the starting control. Further, in step Sb9, when the control program determines that the starting injection time TICR is not less than the injection time upper limit value Tmax, that is, the starting injection time TICR becomes equal to or more than Tmax (step Sb9: NO), and that the starting injection number n is not equal to the number of repetition N, that is, the starting injection number n does not arrive at the number of repetition (step Sb10: NO), the control program performs the determination of finishing of starting in step Sb13 while maintaining the present starting injection time TICR.

FIG. 14 is a view in which the starting injection time TICR is changed with the number of repetition N set to 4 in the processing shown in FIG. 13. The TCIR is increased in a step-like manner by $\Delta ti$ for every four injections, and when a cumulative starting injection time arrives at Tmax, cranking is continued in a state that the TCIR is maintained. Here, $\Delta ti$ and the number of repetition N are preliminarily determined such that the minimum value at which the TICR is changed is the minimum required injection quantity (lower-limit concentration required injection quantity) at the ethanol reference concentration set by the predetermined set, and the maximum value at which the TICR is changed is the maximum required injection quantity (upper-limit concentration required injection quantity) at such ethanol concentration.

Due to the above-mentioned processing in FIG. 13, even when ethanol or gasoline is refilled at the time of stopping the engine, the mixing ratio of the fuel remaining in the fuel pipe maintains the state before refilling. Accordingly, by performing the starting control using the reference fuel injection quantity map corresponding to the ethanol reference concentration at the time of performing the usual operation immediately before the main SW is stopped, it is possible to perform the rapid starting control in a proper state while obviating the covering of the plug with respect to the engine 1. Further, in the processing shown in FIG. 13, each time the starting injection number n arrives at the number of repetition N, the TICR is increased by the increment width $\Delta ti$. Accordingly, until the starting of the engine 1 is finished, it is possible to perform the starting control by gradually increasing the fuel injection time, that is, by gradually increasing the fuel injection quantity injected from the injector 5.

Here, in the processing shown in FIG. 13, the starting control which stores any one of the E22% map, the E50% map, the E80% map and the E100% map in the EEP-ROM 24 is described. However, only the ethanol concentration learnt value or the reference concentration is stored in the EEP-ROM 24 and the corresponding reference fuel injection quantity map may be read from the ROM 23 based on the value read from the EEP-ROM 24 at the time of performing starting of next time.

Further, in the processing shown in FIG. 13, each time the starting injection number n arrives at the number of repetition N, the TICR is increased by the increment width Δti. However, the present invention is not limited to such an embodiment and the TICR may be increased by the increment width Δti each time a period in which the injection is performed exceeds a fixed time.

Next, the second embodiment of the present invention is explained. With respect to the starting control of the engine 1, in the first embodiment, the ethanol concentration during the operation is detected at the time of performing the usual operation, and when the engine 1 is stopped and the engine 1 is operated again, the starting control which initiates the starting of the engine by reference to the ethanol concentration detected during the operation is performed. To the contrary, the second embodiment is configured to perform the starting control by sequentially changing the reference fuel injection quantity maps in order from the minimum reference concentration of ethanol, that is, from the E22% map. Here, in the second embodiment, as the starting control information, the increment width Δti of the starting injection time for every ethanol concentration, the number of repetition N, and the upper limit value of the starting injection time Tmax are preliminarily stored corresponding to the reference fuel injection quantity map for every reference concentration.

Figure 15:
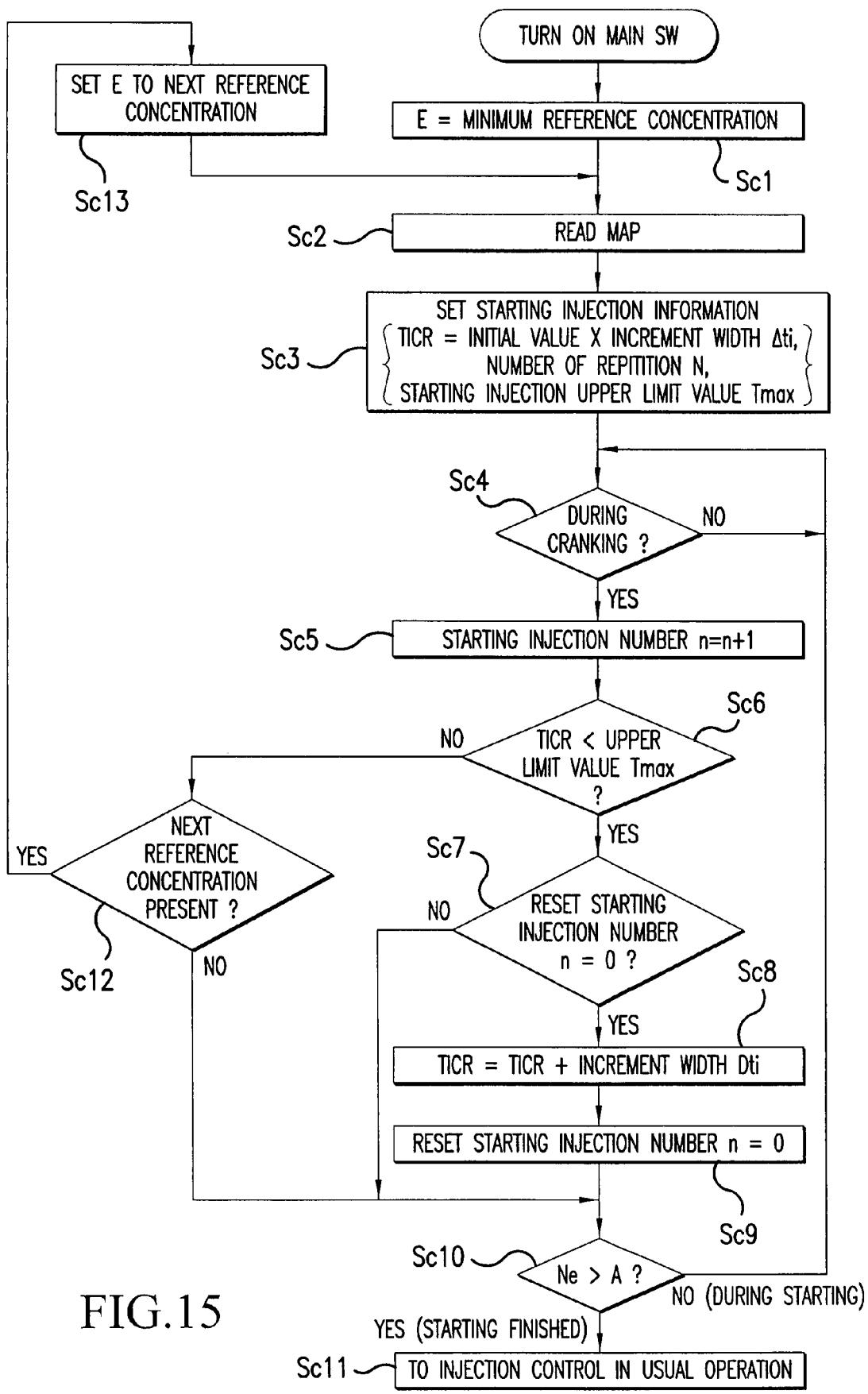
FIG. 15 is a flowchart showing a processing of a starting control according to a second embodiment of the present invention.

FIG. 15 is a flowchart showing the steps of processing of starting control according to the second embodiment. First of all, when the main SW is turned on to start the supply of electricity to the ECU 10 from the battery and the control program of the CPU 21 is started, the control program sets the minimum reference concentration, that is, the ethanol reference concentration of the 22% as the variable E (step Sc1). Here, by setting the ethanol concentration of 22%, the starting injection time inputted to the injector 5 shown in FIG. 7(a) is set as the shortest time, that is, the fuel injection quantity of the mixed fuel made of ethanol and gasoline injected from the injector 5 is set to the smallest state. Next, the control program reads the reference fuel injection quantity map from the ROM 23 in accordance with the value of the predetermined reference concentration. The program control, first of all, reads the E22% map (step Sc2). Next, the control program reads the starting control information from the E22% map, and obtains the TICR which is an initial value of the starting injection time based on the starting injection table contained in the read starting injection information and the water temperature of the cooling water of the engine 1 measured by the TW sensor 13. Further, the control program also reads the increment width Δti, the number of repetition N and the starting injection time upper limit value Tmax which correspond to the E22% map, and performs setting of these information in the control program. Here, a variable of the starting injection number n is reset to 0 (step Sc3).

Next, the control program of the CPU 21 determines whether the operation on the engine is during cranking or not (step Sc4). When the operation of the engine is not during cranking, until the cranking is started, the determination is continued. When it is determined that the operation of the engine is during cranking, a value which is obtained by adding 1 to the present starting injection number n substitutes the starting injection number n. In the initial time, 1 substitutes the starting injection number n (step Sc5). Next, the control program determines whether the starting injection time TICR is less than the starting injection time upper limit value Tmax or not (step Sc6). When it is determined that the starting injection time TICR is less than the starting injection time upper limit value Tmax (step Sc6: YES), next, the control program determines whether the starting injection number n is equal to the number of repetition N or not (step Sc7). When the control program determines that the starting injection number n is equal to the number of repetition N (step Sc7: YES), a value which is obtained by adding the increment width Δti to the present TICR substitutes the TICR (step Sc8) and the starting injection number n is reset to 0 (step Sc9). Next, the control program determines whether the starting is finished or not based on whether the present engine rotational speed (Ne) which is calculated based on the measured value of the CRK sensor 14 exceeds the threshold value (A) indicative of the rotational speed which becomes the reference for the starting determination or not (step Sc10). When the control program determines that the present engine rotational speed (Ne) exceeds the threshold value (A) and the starting is finished (step Sc10: YES), since the usual operation is started, the control program performs the injection control at the time of performing the usual operation, that is, performs the processing shown in FIG. 10 (step Sc11).

On the other hand, when it is determined that the present engine rotational speed (Ne) is equal to or less than the threshold value (A) and the engine is during the starting (step Sc10: NO), the processing returns to step Sc4 for continuing the starting control. Further, when it is determined that the starting injection number n is not equal to the number of repetition N, that is, the starting injection number n does not arrive at the number of repetition (step Sc7: NO), the control program performs the determination of finishing of starting in step Sc10 while maintaining the present starting injection time TICR.

On the other hand, in step Sc6, when it is determined that the starting injection time TICR is not less than the starting injection time upper limit value Tmax, that is, when the starting injection time TICR becomes equal to or more than Tmax (step Sc6:NO), the control program references the variable E and determines whether the next reference concentration exists or not (step Sc12). When it is determined that the next reference concentration does not exist, that is, the present reference concentration is ethanol 100%, there is no further reference fuel injection quantity map and hence, the E100% map is maintained and the processing advances to starting finishing determining processing in step Sc10. On the other hand, when the control program references the variable E and determines that the next reference concentration exists (step Sc12: YES), the control program sets the next reference concentration as the variable E (step Sc13), and repeats the processing in step Sc2 and the steps which follow step Sc2 until the engine 1 is started.

Due to the above-mentioned processing of the second embodiment, it is possible to perform the starting control by changing the reference concentration of ethanol in order from the minimum reference fuel injection quantity map to the reference fuel injection quantity map of higher reference concentration. Due to the changeover of the reference fuel injection quantity map, injection state is changed over from the state in which the fuel injection time is short to the state in which the fuel injection time is long corresponding to the state of starting until the starting of engine 1 is finished. This enables the starting control which changes over the fuel injection state from the state in which the fuel injection quantity of the mixed fuel of ethanol and gasoline is smallest to the state in which the fuel injection quantity is large corresponding to the state of starting until the starting of the engine 1 is finished after the initiating the starting control. Accordingly, it is possible to perform the starting control in the proper state while obviating the covering of plug in the engine 1.

Here, the above-mentioned Pb/Ne map is described as the information indicative of the relationship between the PBA, the Ne and the intake air quantity. However, a basic fuel injection time (TIM) may be calculated based on the intake air quantity and the target air/fuel ratio, and a three dimensional map indicative of the relationship among the calculated basic fuel injection time (TIM), the PBA and the Ne may be prepared. Further, also with respect to the Ne/TH map, a three dimensional map indicative of the relationship between the basic fuel injection time (TIM), the Ne and the TH may be prepared.

Further, in the above-mentioned embodiment, the control processing is performed based on the water temperature (TW) of the cooling water of the engine 1. However, in place of the water temperature of the cooling water, the correction may be performed based on an output of a temperature sensor or the like which detects an oil temperature of the engine oil of the engine 1 or a temperature sensor which detects a temperature of the cylinder or a cylinder head.

Further, the whole or a partial function of the ECU 10 in the above-mentioned embodiment may be realized by recording the program for realizing these functions in a recording medium which can be read using a computer, by reading the program recorded in the recording medium using a computer system, and by executing the program. Here, the "computer system" includes an OS and hardware such as peripheral equipment.

Further, "the recording medium which can be read by a computer" means a portable medium such as a flexible disc, a photo magnetic disc, a ROM, a CD-ROM, and a memory device such as hard disc installed in the computer system. Further, "recording medium which can be read with the computer" may include a medium which can maintain the program dynamically for a short time such as communication lines for transmitting the program via a network such as the internet or communication lines such as telephone lines, or a medium which falls the program for a fixed time such as a volatile memory installed in the inside of the computer system which becomes a server or a client in such a case. Further, the above-mentioned program may be used for realizing some of the above-mentioned functions, and also may realize such functions in combination with a program which is already recorded in the computer system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control device of a internal combustion engine that is adapted to use multiple kinds of fuel, the control device comprising:
   a starting completion detection means adapted to detect a starting state of an internal combustion engine, and adapted to determine a fuel injection quantity in response to a state of the internal combustion engine after detecting the completion of starting by the starting completion detection means,
   wherein the control device stores a plurality of reference fuel injection quantity maps corresponding to a mixed concentration of the multiple kinds of fuel, and also stores which map out of the plurality of reference fuel injection quantity maps is used, and
   wherein a start control of the internal combustion engine is performed by the control device based on stored data of the reference fuel injection quantity map which is used immediately before previous stopping at a time of initiating of starting, and at the same time, the start control is performed by gradually increasing a fuel injection quantity until the starting of the internal combustion engine is completed.

2. The fuel injection control device according to claim 1, wherein the fuel injection quantity is increased when the starting is not completed even when cranking is performed by injecting the fuel a predetermined number of times based on the reference fuel injection quantity map used at the time of initiating the starting.

3. The fuel injection control device according to claim 1, wherein the fuel injection quantity is increased when the starting is not completed even when cranking is performed by injecting the fuel for a predetermined duration of time based on the reference fuel injection quantity map used at the time of initiating the starting.

4. The fuel injection control device according to claim 1, wherein the reference fuel injection quantity map includes three kinds or more of Pb/Ne maps corresponding to mixing ratios of ethanol and gasoline.

5. The fuel injection control device according to claim 1, further comprising an oxygen concentration sensor for generating an output in response to oxygen concentration in an exhaust gas is arranged in an exhaust system of the internal combustion engine, and
   an ethanol mixing ratio in the fuel is estimated based on the output of the oxygen concentration sensor.

6. A fuel injection control device of an internal combustion engine that is adapted to use multiple kinds of fuel comprising:
   a starting completion detection means adapted to detect a starting state of an internal combustion engine, and adapted to determine a fuel injection quantity in response to a state of the internal combustion engine after detecting the completion of starting by the starting completion detection means,
   wherein the control device stores a plurality of reference fuel injection quantity maps corresponding to a mixed concentration of the multiple kinds of fuel, and
   wherein starting control of the internal combustion engine is performed by the control device using the reference fuel injection quantity map with the least fuel injection quantity at a time of initiating the starting, and at the same time, the starting control is performed by changing over to the reference fuel injection quantity map with more fuel injection quantity in response to the state of starting until the starting of the internal combustion engine is completed.

7. The fuel injection control device according to claim 6, wherein the fuel injection quantity is increased when the starting is not completed even when cranking is performed by injecting the fuel a predetermined number of times based on the reference fuel injection quantity map used at the time of initiating the starting.

8. The fuel injection control device according to claim 6, wherein the fuel injection quantity is increased when the starting is not completed even when cranking is performed by injecting the fuel for a predetermined duration of time based on the reference fuel injection quantity map used at the time of initiating the starting.

9. The fuel injection control device according to claim 6, wherein the reference fuel injection quantity map includes three kinds or more of Pb/Ne maps corresponding to mixing ratios of ethanol and gasoline.

10. The fuel injection control device according to claim 6, further comprising an oxygen concentration sensor for generating an output in response to oxygen concentration in an exhaust gas is arranged in an exhaust system of the internal combustion engine, and an ethanol mixing ratio in the fuel is estimated based on the output of the oxygen concentration sensor.

11. A fuel injection control device of an internal combustion engine that is adapted to use multiple kinds of fuel comprising:

a starting completion detection means adapted to detect a starting state of an internal combustion engine, and adapted to determine a fuel injection quantity in response to a state of the internal combustion engine after detecting the completion of starting by the starting completion detection means;

a first memory for storing a plurality of reference fuel injection quantity maps corresponding to a mixed concentration of the multiple kinds of fuel;

a second memory for storing which map is used out of the plurality of reference fuel injection quantity maps, wherein the control device performs a start control of the internal combustion engine based on data from the reference fuel injection quantity map which is used immediately before previous stopping at a time of initiating of starting, and at the same time, performs the start control by gradually increasing a fuel injection quantity until the starting of the internal combustion engine is completed.

12. The fuel injection control device according to claim 11, wherein the fuel injection quantity is increased when the starting is not completed even when cranking is performed by injecting the fuel a predetermined number of times based on the reference fuel injection quantity map used at the time of initiating the starting.

13. The fuel injection control device according to claim 11, wherein the fuel injection quantity is increased when the starting is not completed even when cranking is performed by injecting the fuel for a predetermined duration of time based on the reference fuel injection quantity map used at the time of initiating the starting.

14. The fuel injection control device according to claim 11, wherein the reference fuel injection quantity map includes three kinds or more of Pb/Ne maps corresponding to mixing ratios of ethanol and gasoline.

15. The fuel injection control device according to claim 11, further comprising an oxygen concentration sensor for generating an output in response to oxygen concentration in an exhaust gas is arranged in an exhaust system of the internal combustion engine, and an ethanol mixing ratio in the fuel is estimated based on the output of the oxygen concentration sensor.

16. The fuel injection control device according to claim 11, wherein the first memory is read only memory (ROM).

17. The fuel injection control device according to claim 11, wherein the second memory is erasable memory (EEPROM).

18. The fuel injection control device according to claim 11, wherein a percentage of the ethanol ranges from 0% to 100%.

* * * * *